N. Colver,

Bed Bottom,

No. 220.

Reissued July 6, 1852.

UNITED STATES PATENT OFFICE.

NATHANIEL COLVER, OF SOUTH ABINGTON, MASSACHUSETTS.

IMPROVEMENT IN BEDSTEADS.

Specification forming part of Letters Patent No. 6,336, dated April 24, 1849; Reissue No. 220, dated July 6, 1852.

*To all whom it may concern:*

Be it known that I, NATHANIEL COLVER, of South Abington, in the county of Plymouth and Commonwealth of Massachusetts, late of Boston, in said Commonwealth, clergyman, have invented a new and useful Improvement in Bedsteads; and I do hereby declare that the same are fully described and represented in the following specification and accompanying drawings, letters, figures, and references thereto, being an amended specification of the same invention made according to law.

Figure 1:
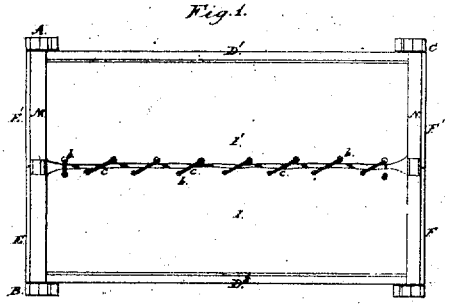
Figure 2:
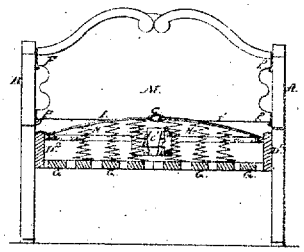
Figure 3:
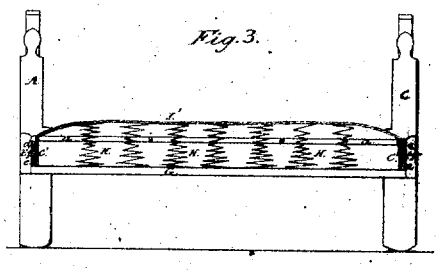
Figure 4:
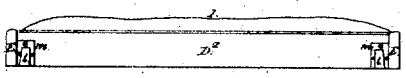
Figure 5:
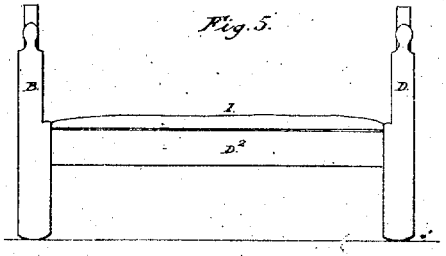
Figure 8:
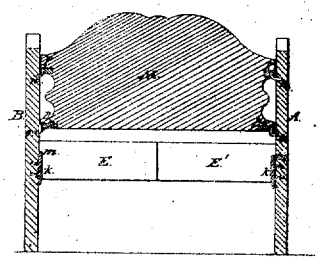
Figure 6:
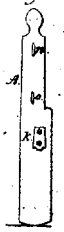
Figure 7:
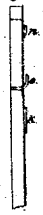
Figure 9:
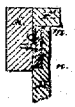

Of the said drawings, Figure 1 denotes a top view of my improved bedstead. Fig. 2 is a vertical and transverse section of it. Fig. 3 is a central, vertical, and longitudinal section of it. Fig. 4 is an external side view of what I term one of the halves or parts of the bed foundation. Fig. 5 is a side elevation of the bedstead. Fig. 6 is an inner side view of one of the posts. Fig. 7 is an edge view of it. Fig. 8 is a vertical cross-section taken through two of the posts. Fig. 9 is a horizontal section of one of the posts and the immediate part of the bedstead to which it is connected.

In the said drawings, A B C D represent four posts. D′ D² are vertical rails, boards, or sides of the foundation of the bed, each being connected to two vertical head and foot rails or boards, E E′ or F F′, arranged as seen in the drawings. The two boards E E′, as well as the two F F′, are connected together at their lower edges by a series of parallel and longitudinal rails or slats, G G, &c. These slats serve to support a series or number of wound spiral or double conico-helical springs, H H, &c., which rest on them and are fastened to them. Over and upon the said springs a sacking, I or I′, is laid and fastened to them, and at three of its edges it is riveted or otherwise properly secured to the cleats *a a*, which run along the inner sides of the boards D′ E E′ or D² F F′. The two inner edges of the two sackings are provided with a series of eyelets or lacing-holes, *b b*, &c., through which a cord or lacing, *c*, is passed from one sacking to the other. Where each two end boards, E E′ or F F′, come together, they are fastened or drawn together by a dovetailed wedge, *c′*, and three clamps, *d e f*, two of which are fastened to one of the end boards and the third to the other. The third clamp passes between the first and second, each clamp being formed with a small projection, *i*, against which the wedge or key acts. Each post has a trapezoidal tenon or piece of metal, *k*, screwed to its inner side, as seen in Figs. 6, 7, and 8, the base or widest part of the same being arranged downward, while the side edges of the trapezoid are beveled, as seen in Fig. 9. When the post is applied to the rail of the foundation, this trapezoidal dovetailed tenon fits into a corresponding socket, *l*, made in a piece of metal, *m*, screwed to the side of the rail, the four posts being applied to the rails D D², as seen in the drawings. Two hooks, *n o*, are inserted in the inner face of each post, and so that their bent ends shall stand vertically. They are respectively made to pass up into holes or mortises made upward, and in two ears of four ears or projections, *p p p p*, of a head-board or a foot board, M or N.

From the description hereinbefore given it will readily be seen how easy a matter it is to take the above bedstead apart, or to set it up, or to put it together.

The combination of parts is a very compact, portable, and convenient one.

The bedstead when set up and confined together is ready to receive a mattress or bed on the sacking.

It will be seen by the above-described method of uniting the two parts of the box or foundation of the mattress or bed by means of the lacing or its equivalent and the clamps and wedges or their equivalent the parts of the box may be made to fold over one upon the other hinge-form without unlacing the sacking, or be entirely separated, as occasion may require, so as to secure the portability of the bedstead as a package, and also the complete unity of the box when unfolded or clamped together as a bedstead, which are the main objects aimed at by the invention.

I lay no claim to a combination of rest bars or boards, spiral or wound wire springs, a sacking, and closing frame used to support a cushion or mattress, such a combination having been employed in the manufacture of sofas andother articles of furniture; but

What I claim as my invention is—

The method in which I construct the foundation of the bed or mattress by means of the above-described appliances or their equivalents—to wit, the lacing and the clamps and keys or wedges, so as to render the bedstead portable by being taken apart—or infolded the one part over the other, or united together or unfolded, as above described, as occasion may require—that is to say, I claim the combination of the two frames or halves of a box, each of said frames or halves consisting of a side, two ends, and bottom or slats, supporting wire springs, and a sacking affixed to its side and two ends, and supported on springs or stuffing, as occasion may require, and these halves or parts so united that when together or unfolded they form but one box or frame, supporting or holding fast the sacking at its entire extremity without any separating or supporting partition in the center, and this union or junction of the two parts is effected by the above-described lacing or its equivalent and clamps and bars or wedges, or their equivlent.

I lay no claim to any one of the elements of the aforesaid or above-described combinations when separate from the rest, but intending only to claim the whole as combinations constituting a bedstead or foundation for a bed or mattress to which the parts, as above described, or their equivalents, may be applied, as aforesaid.

In testimony whereof I have hereunto set my hand this 17th day of May, in the year 1852.

NATHANIEL COLVER.

In presence of—
AARON D. WELD,
S. E. SEWALL.